United States Patent [19]

Mizuno et al.

[11] 4,267,587
[45] May 12, 1981

[54] ELECTRONIC TIMEPIECE CIRCUIT

[75] Inventors: Mamoru Mizuno, Yamanashi; Hanzou Tsuzuki, Yamato, both of Japan

[73] Assignee: Casio Computer Co., Ltd., Tokyo, Japan

[21] Appl. No.: 6,925

[22] Filed: Jan. 26, 1979

[30] Foreign Application Priority Data

| Feb. 17, 1978 [JP] | Japan | 53/17337 |
| Feb. 17, 1978 [JP] | Japan | 53/17338 |
| Feb. 20, 1978 [JP] | Japan | 53/18389 |

[51] Int. Cl.³ .......................................... G04C 19/00
[52] U.S. Cl. .......................................... 368/85; 368/86; 368/87; 368/217; 368/218; 368/219
[58] Field of Search .......... 58/23 R, 85.5, 50 R, 58/16 R, 57.5; 328/129, 130; 364/705; 368/85–87, 217, 48, 219

[56] References Cited

U.S. PATENT DOCUMENTS

| 3,788,058 | 1/1974 | Idei et al. | 58/23 R |
| 3,798,428 | 3/1974 | Tzawa | 58/23 R X |
| 3,986,333 | 10/1976 | Kimura et al. | 58/23 R X |
| 4,078,375 | 3/1978 | Kashio | 53/23 R |
| 4,092,819 | 6/1978 | Takase | 58/23 R |
| 4,125,993 | 11/1978 | Emile, Jr. | 58/23 R |
| 4,155,218 | 5/1979 | Wiget | 58/23 R |

OTHER PUBLICATIONS

"Digital Computer Basics", pg. 123, Dover Publications, Inc., New York, 1969.

*Primary Examiner*—Ulysses Weldon
*Attorney, Agent, or Firm*—Frishauf, Holtz, Goodman and Woodward

[57] ABSTRACT

An electronic timepiece circuit is provided with an oscillator for producing a reference signal and a frequency dividing circuit which frequency-divides the reference signal from the oscillator to produce a signal with given time intervals. Clock data stored in the memory is read out therefrom by a timing signal corresponding to the output signal from a given stage of the frequency dividing circuit and is loaded into a shift register where it is stored temporarily. The clock data stored in the memory is read out therefrom at given time intervals by a control signal obtained in accordance with the output signal from a given stage of the frequency dividing circuit, and the read out clock data, together with the clock data read out to the shift register, is subjected to a given operation, with the result that the clock data is updated. The updated clock signal is loaded into the memory by a control circuit.

10 Claims, 8 Drawing Figures

ELECTRONIC TIMEPIECE CIRCUIT

BACKGROUND OF THE INVENTION

The present invention relates to an electronic timepiece circuit.

Recently, a proposal has been made in which a clock circuit is assembled into an electronic apparatus such as an electronic cash register or an electronic calculator and data is processed with respect to time. In general, the clock circuit is constructed by an oscillator, a frequency-divider which frequency-divides the output signal from the oscillator to form a "one second" signal and time count circuits for producing "second", "minute" and "hour" signal through counting the "one second" signal. In this type electronic apparatus, when clock data is transferred from the clock circuit to the apparatus main circuit, it is temporarily stored in a memory and then is transferred from the memory to the main circuit. The electronic apparatus as just mentioned has alarm and timer functions in order to more effectively use the clock from the clock circuit. For example, in an electronic cash register, the clock data is used to inform operators of a changing time or to collect data thus far registered at a previously set time for the purpose of effecting the supervising by time. Conventionally, write and read of data to and from the memory and various controls of the clock circuit are carried out by using a microprogram previously stored in ROM (read only memory) in the order of the control. For this reason, when the performance of the electronic apparatus is improved, the microprogram is correspondingly complicated and thus a burden on the software is severe. The time setting data for making an alarm also is preset in the memory. When the time setting data compares with the clock data, both data must simultaneously be read out from the memory. If a plurality of the time setting data are used, the clock data must be read out for each comparing of the time setting data so that the control manner is complex and the total time taken for all the time setting data to be compared is elongated. In the electronic apparatus with the clock circuit, even if the power source to the main circuit of the apparatus is turned off, it should be avoided that the power source to the clock circuit is turned off. For this, the conventional apparatus is provided with individual power sources for the clock circuit. This also requires a circuit construction with less power consumption for the clock circuit.

Accordingly, an object of the invention is to provide a clock circuit well adapted for an electronic timepiece apparatus.

SUMMARY OF THE INVENTION

The present invention may broadly be interpreted as a clock apparatus in which clock data stored in a RAM at given time intervals is read out into a shift register and is subjected to a given operation thereby to update the clock data, and the clock data updated is held in a recirculating manner while is it compared with time setting data through the comparison. Further, the updating of the clock data and the comparing operation are carried out by using the output signals from a given stage of a frequency divider.

With such a construction, power consumption is little, the burden on the software is lessened, the circuit construction is simple, the data comparison is performed rapidly and the time counting data may be used as time supervising data.

Other objects and features of the invention will be apparent from the following description taken in connection with the accompanying drawings.

BRIEF DESCRIPTION OF THE DRAWINGS

FIGS. 2(A) to (K) show a timing chart illustrating a relation among basic signal waveforms in the circuit in FIG. 1;

FIGS. 5(L) to (V) and FIG. 6 show a timing chart for illustrating a relation among signal waveforms useful in explaining the operation of the circuit shown in FIG. 4;

FIGS. 8(a) to (j) show a timing diagram for illustrating a relation among signal waveforms useful in explaining the operation of the circuit shown in FIG. 7.

DETAILED DESCRIPTION

Figure 1:
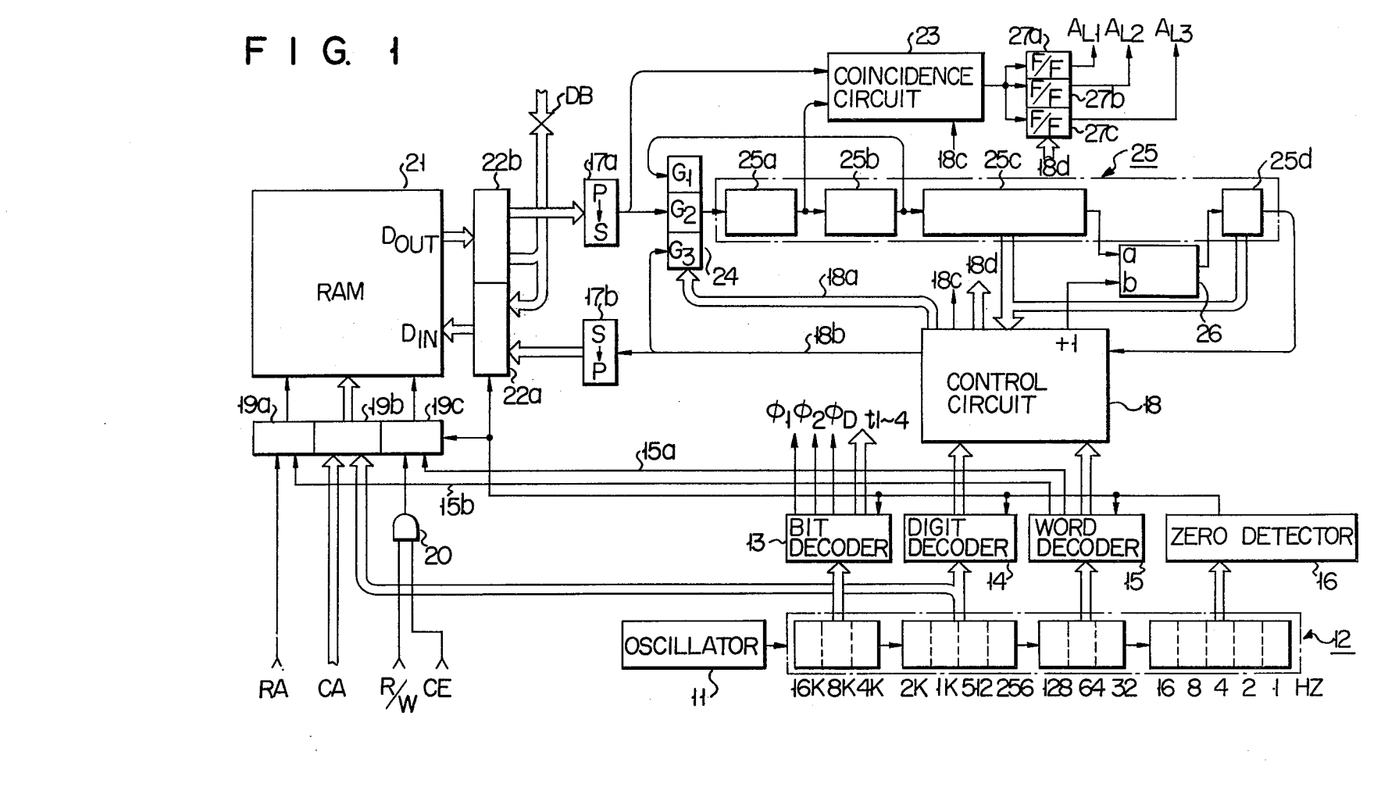
FIG. 1 shows a block diagram of an electronic timepiece circuit according to a preferred embodiment of the invention.
Figure 2:
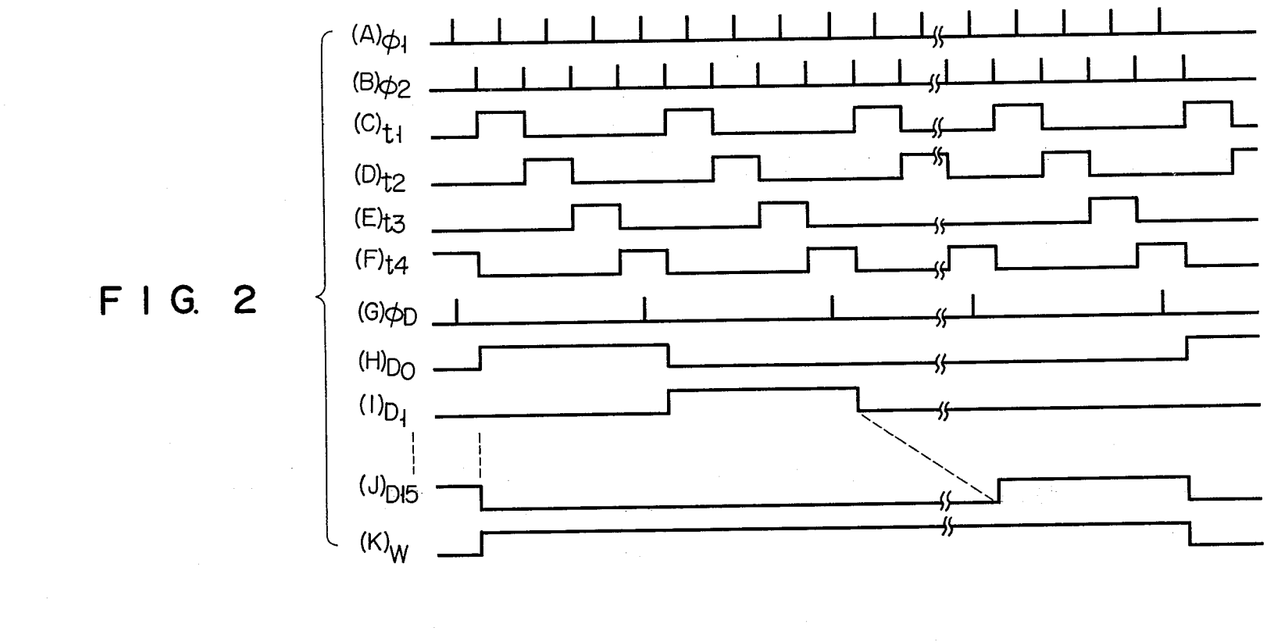

Referring now to the drawings and, particularly, to FIG. 1, there is shown a preferred electronic timepiece circuit according to the invention. Oscillator 11 produces a basic pulse signal with 32,768 Hz, for example, which in turn is applied to a frequency dividing binary counter 12 where it is frequency divided. The frequency dividing binary counter 12 comprises $2^n$ flip-flops connected in cascade fashion, as seen in FIG. 1. The frequency dividing binary counter 12, which is constructed by 15 bits, for example, sequentially frequency-divides the incoming 32,768 Hz signal to finally be 1 Hz. 16 kHz to 4 kHz, which is bit outputs from the frequency dividing counter 12 after frequency dividing, is applied to a bit decoder 13:2 kHz to 256 Hz to a digit decoder 14; 128 to 32 Hz to a word decoder 15; 16 to 1 Hz to a zero detector 16. The zero detector 16 detects a state that all the bit outputs for 16 to 1 Hz from the counter 12 are zero and produces logical level "1" which in turn is applied as an operation command to bit, digit and word decoders 13 to 15 thereby to control these decoders. In this case, when the detected signal is logical level "1", the respective decoders 13 to 15 are operable while when it is logical level "0", the decoders are inoperable. The bit decoder 13 decodes an input pulse to produce clock pulses $\phi 2$ shown in FIG. 2(A) and (B), bit signals t1 to t4, shown in FIGS. 2(C) to (F), constituting a digit data of four bits, and a clock pulse $\phi_D$, shown in FIG. 2(G), which is produced for each bit signal t4. The digit decoder 14 decodes an input signal to produce digit signals Do to D15 shown in FIGS. 2(H) to (J). The word decoder 15 decodes an input pulse to produce word signals W1 to W8. Each of the word signals Do to D15 continues logical "1" state during the time that digit signals Do to D15 (one word) are produced. The decoder 15 is provided with a couple of output lines 15a and 15b through which 128 Hz and 64 Hz bit signals derived from the frequency dividing counter 12 are sent out. The signal delivered through the output line 15a is read/write command signal to be directed to gate circuit 19c. The signal delivered through the output line 15b is a row address signal to be directed to gate circuit 19a. Gate circuit 19c is supplied with a read/write (R/W) signal and a chip enable signal CE which are delivered through AND circuit 20 from the main circuit of the electronic apparatus, i.e. from the outside of the clock circuit. Gate circuit 19a is also supplied with a row address RA from the main circuit. Gate circuit 19b is supplied with a column address CA from the main circuit and the bit output signals 2 kHz to 256 Hz from the frequency counter 12 as column address signals. Gate circuits 19a to 19c are gate-controlled by the zero-detected signal delivered from the zero-detecting circuit 16. When the zero-detected signal is "0", the signals CA, RA, R/W and CE coming from the main circuit of the electronic apparatus are produced by gate circuits 19a to 19c. When it is "1", gate circuits 19a to 19c permit the bit output signals 2 kHz to 256 Hz from frequency dividing counter 12 and the signals from the word decoder 15 to pass therethrough to RAM (random access memory) 21 for storing timer data, alarm setting data and preset time.

Figure 3:
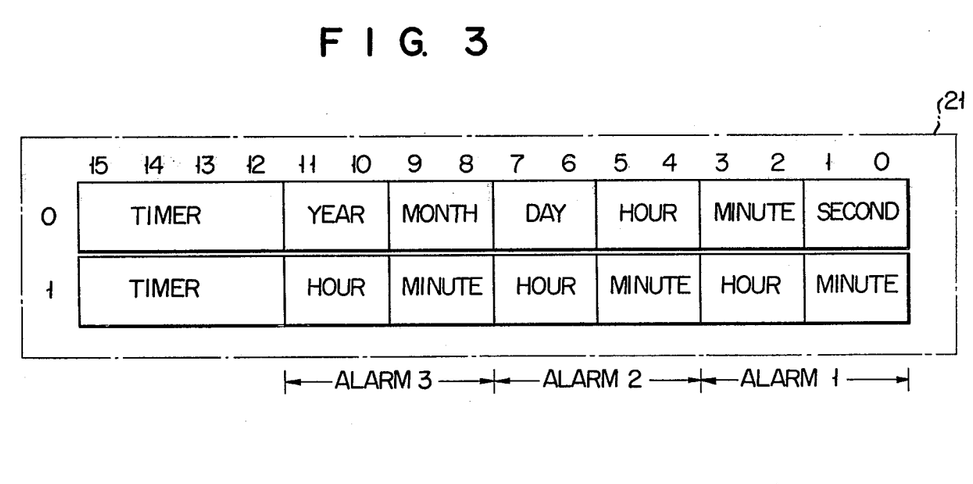
FIG. 3 shows example of the contents of a RAM used in the circuit shown in FIG. 1.

The memory map of RAM 21 is as illustrated in FIG. 3, with an arrangement of two rows and 16 columns. 11 to 0 columns on 0 row store year, month, day, hour, minute and second, each occupying two columns, in this order, i.e. present data and time. 15 to 12 columns on the same column store timer setting data. 15 to 12 columns on one row store timer setting data and 11 to 0 columns store three kinds of alarms AL3 to AL1 each having hour and minute.

RAM 21 thus mapped receives write data of parallel four bits through gate circuits 22a and data bus DB continuous to the main circuit. Data stored in RAM 21 is read out therefrom in parallel four bits and is applied to P-S converter 17a through gate circuit 22b, which converts parallel four bits into series four bits. The output signal from the P-S converter 17a is applied to coincidence circuit 23 and also to gate circuit 24 which is controlled by a signal delivered through output line 18a of a control circuit 18. The output signal from gate circuit 24 is inputted to a shift register 25a of two digits (8 bits). The output of shift register 25a is coupled in transmitting relation with coincidence circuit 23 and shift register 25b of two digits. The output of shift register 25b is coupled in transmitting relation with gate circuit 24 and with shift register 25c of 11 digits (44 bits). The respective bit output signals of the shift register 25c are transferred to control circuit 18 and the final digit output of the same is applied to the input terminal a of adder 26. Adder 26 is coupled at the input terminal b with a +1 signal from control circuit 18. The output signal of the adder 26 is applied to control circuit 18 through shift register 25d of one digit (4 bits). Shift registers 25a to 25d constitute clock register 25. Clock register 25 stores data transferred through gate circuit 22b, P-S converter 17a and gate circuit 24 from RAM 21, in their original condition and its shift operation is controlled by clock pulses $\phi1$ and $\phi2$ outputted from bit decoder 13. Control circuit 18 transfers clock data received from clock register 25 to S-P converter 17b, through output line 18b. S-P converter 17b converts serial data to parallel data and its output is delivered to RAM 21 through gate circuit 22a and through gate circuit 24 to clock register 25. Control circuit 18 transfers an operation command through output line 18c to coincidence circuit 23. Upon receipt of the operation command from control circuit 19, coincidence circuit 23 compares alarm data read out from RAM 21 with present time fed from clock register 25, and delivers the result of the comparison to flip-flops 27a to 27c which operate under control of the output signals derived from control circuit 18 through output line 18d. These flip-flops operate at different timings. That is, coincidence and not coincidence between three kinds of alarm data stored in RAM 21 and the present time is stored in flip-flops 27a to 27c. The outputs of flip-flops 27a to 27c are transferred as alarm signal AL1 to AL3 to the main circuit of the electronic apparatus.

Figure 4:
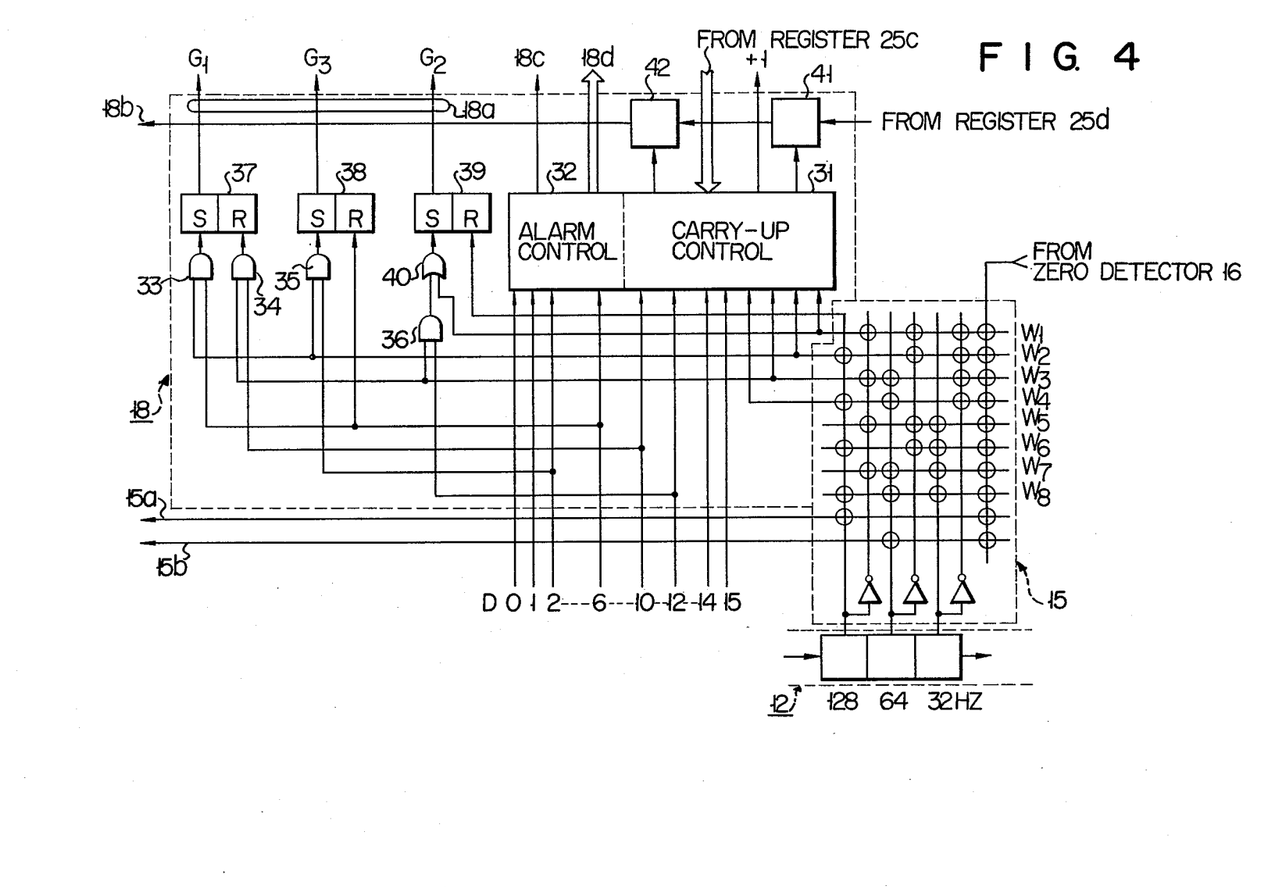
FIG. 4 shows a schematic circuit of a partial circuit shown in the circuit in FIG. 1.
Figure 5:
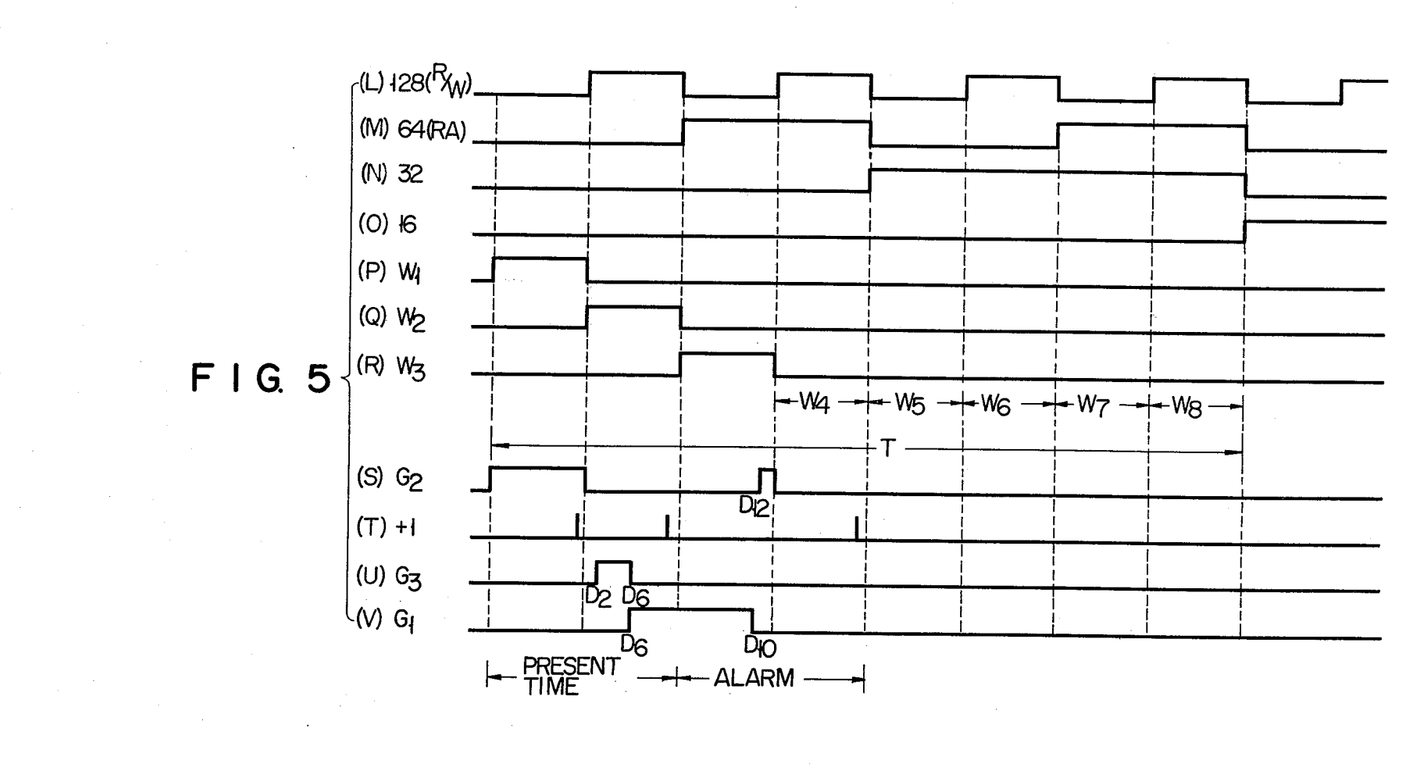
Figure 6:
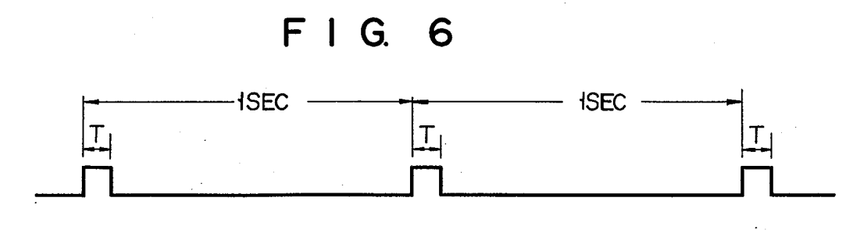

The details of the control circuit 18 and the word decoder 15 will be described in greater detail with reference to FIGS. 4 to 6. The circuits 18 and 15 are schematically illustrated in FIG. 4. The word decoder 15 is in output-ready condition only when the detected signal from the zero detecting circuit 16 is "1". Under this condition, the word decoder 15 produces word signals W1 to W8 in accordance with the bit output signals 128 to 32 Hz from the frequency dividing counter 12. As shown in FIG. 5, when the bit output signal of 128 Hz to 32 Hz is "000", the word decoder 15 produces a word signal W1. When it is "100" a word signal W2 is produced. When it is "010", a word signal W3 is produced. When it is "110", a word signal W4 is produced. Similarly, the word decoder 15 produces sequentially word signals W5 to W8 in the binary coded form, although description of these signals will be omitted. These signals have waveforms as shown in FIG. 5. After the signal W8 is produced, at the trailing edge of the bit output of 128 Hz the bit outputs of 128 to 32 Hz are all "0" and at the same time the bit output of 16 Hz from the frequency counter 12 becomes logical "1". When the bit output of 16 Hz becomes "1", the zero detected signal from the zero detecting circuit 16 becomes logical "0" so that the word decoder 15, the digit decoder 14 and the bit decoder 13 stop their operations. The stoppage of these decoders 13 to 15 is continued until the zero detected signal is logical level "1". As illustrated in FIG. 6, these decoders 13 to 15 are operable only during a time period T within one second. The output of 128 Hz is transferred as a read/write signal to the gate circuit 19c through an output line 15a. The output signal of 64 Hz is transferred as a row address to the gate circuit 19a, through the output line 15b. The word signals W1 to W4 are applied to the control circuit 19. The control circuit 18 is provided with a carry-up control circuit 31 and an alarm control circuit 32. These control circuits 31 and 32 are supplied with digit signals Do to D15 from the digit decoder 14. The control circuit 18 also includes AND circuits 33 to 36, flip-flops 37 to 39 and an OR circuit 40. The AND circuits 33 and 35 are coupled at one end with the word signal W2 and the AND circuits 34 and 36 are coupled at one end with the word signal W3. The digit signal D6 corresponding to "6" digit from the digit decoder 14 is applied to the other input terminal of the AND circuit 33 and the reset terminal of the flip-flop 38. The digit signal D10 for "10" digit is applied to the other input terminal of the AND gate 34. The digit signal D2 of "2" digit is transferred to the other input terminal of the AND circuit 25. The digit signal D12 of "12" is applied to the other input terminal of the AND gate 36. The AND gates 33 and 34 are coupled at the output terminals with the set terminal and the reset terminal of the flip-flop 37 and the AND circuit 35 is connected at the output terminal to the set terminal of the flip-flop 38. The output of the word signal W1, together with the word signal W1 from the word decoder 15, is applied to the OR circuit 40 of which the output terminal is connected to the set terminal of the flip-flop 39. The reset terminal of the flip-flop 39 is coupled with the output signal of 128 Hz from the frequency dividing counter 12. The set side output of the flip-flop 37 is applied as an input control signal G1 from the shift register 25b to the gate circuit 24. The set side output of the flip-flop 38 is applied as an input control signal G3 from the control circuit 18 to the gate circuit 24. The set side output of the flip-flop 39 is applied as an input control signal from the gate circuit 24 to the P-S converter 24.

Further included in the control circuit 18 are gate circuits 41 and 42, which are under control of the carry-up control circuit 31, between the input from the shift register 25d and the output line 18b. These gate circuits 41 and 42 enable controls so as to clear data from the shift register 25d or clear it and make +1 operation. The carry control circuit 31 produces a control signal in accordance with the contents of the shift register 25c which has been stored in the control circuit 31 and transfers it to the gate circuits 41 and 42 and at the same time applies +1 signal to the adder 26 thereby to effect carry control. The alarm control circuit 32 delivers control signals through output lines 18c and 18d to effect an alarm control.

Figure 7:
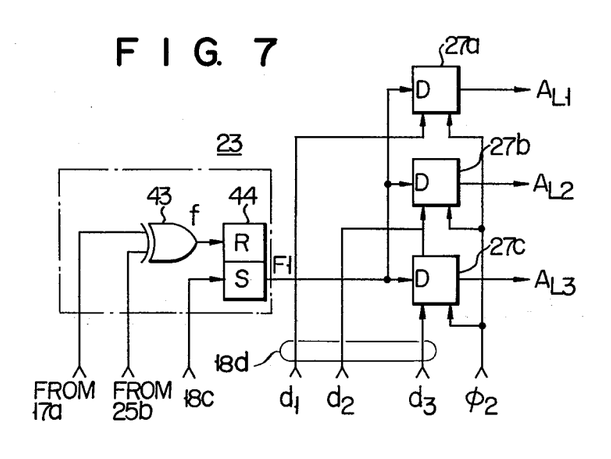
FIG. 7 shows a schematic diagram of a part of the circuit of FIG. 1.

Turning now to FIG. 7, there is shown a circuit diagram of the coincidence circuit 23 which compares various data in a time division manner within one word interval. As shown, the coincidence circuit 23 is comprised of an exclusive OR (referred to as ex-OR) circuit 43 and a flip-flop 44. Alarm data delivered through the gate circuit 22b and the P-S converter 17a from RAM 21 and present time data from the shift register 25a are applied to the ex-OR circuit 43. The flip-flop 44 is connected at the reset input to the output of the ex-OR circuit 43 and at the set input terminal to the control circuit 18 through the output line 18c. The set side output of the flip-flop 44 is coupled with the data input terminals D of delayed flip-flops 27a to 27c. An input signal is loaded into the flip-flops 27a to 27c under control of signals d1 to d3 fed through the output line 18d of the control circuit 18 and the contents of the flip-flops are read out therefrom by a clock pulse φ2. The output signals from the same flip-flops are sent as the alarm signals AL1 to AL3 to the main circuit of the apparatus.

The operation of the clock device for an electronic timepiece apparatus according to the invention of which the construction has been described, will be given. The present data and time data are loaded into RAM 21 by properly operating keys on the key input unit of the electronic apparatus. More specifically, the keying operation for data and time setting in the key input unit causes the apparatus to produce chip enable signal CE, read/write signal R/W, row address RA, column address CA, and data and time data. Those are loaded into RAM 21 in such a way that year, month, day, hour, minute, second at present are stored in columns 11 to 0 on 0 row, as shown in FIG. 3. Loaded into RAM 21 are alarm data and timer data in a similar manner. When the zero detecting circuit 16 detects all "0" and the zero detected signal becomes logical "1", the gate circuits 19a to 19c and 22a and 22b are switched so as to permit data transfer of the data within the clock circuit, resulting in the clock circuit starting the time counting operation. In starting the time counting operation, a reference pulse signal from the oscillator 11 is frequency-divided by the frequency dividing counter 12 so that given frequency-divided output signals are applied to the decoders 13 to 15 and the zero detecting circuit 16. The zero detecting circuit 16 produces logical "1" when detecting the bit output signals from 16 to 1 Hz are all "0". The bit output signals 16 to 1 Hz become all "0" only for 1/32 second for every one second to cause the zero detecting circuit 16 to produce "1" signal which in turn is applied to the decoders 13, 14 and 15. When the zero detected signal "1" is applied to the word decoder 15, the word signal W1 is produced as shown in FIG. 5. When the word signal W1 becomes "1", the flip-flop 39 in the control circuit 18 is set so that the gate control signal G2 to be transferred through the output line 18a becomes "1" as shown in FIG. 5(s) to control the gate circuit 24. As a result, data is read out from RAM 21 and the read out one is loaded into the shift register 25a. When the word signal W1 outputted from the word decoder 15 is "1", the read/write signal R/W outputted through the output line 15a from the word decoder 15 and the row address transferred through the output line 15b are both "0", as seen from FIG. 4. Accordingly, the 0 row of RAM 21 is specified and at the same time the column address is specified by the bit output signals 2 kHz to 256 Hz from the frequency dividing counter 12. As a result, the data and time on the 0 row in RAM 21 are read out. The word signal W1 outputted from the word decoder 15 is applied to the carry control circuit 31 in the control circuit 18. See FIG. 4. The word signal W1 and the column address signal (digit signal D15) cause the carry control circuit 31 to feed at the read out of 15 digit +1 signal to the terminal b of the adder 26. When 15 digit is read out, to the terminal a of the adder 26 is fed the clock data of the "second" signal from the shift register 25c. Accordingly, when the word signal is W1 and the digit signal is D15, 1 is added to the clock data of "second", with the result that the time is updated and a data state in the clock register 25 is checked. The check is conducted in order to control count of the clock data such as year, month, hour, minute, and second in accordance with the contents of count.

Then, when the bit output of 128 Hz in the frequency counter 12 becomes "1", the flip-flop 39 is reset and the read/write R/W becomes "1" and therefore RAM 21 is in write-ready condition. Further, the word signal W2 outputted from the word decoder 15 also becomes "1", as shown in FIG. 5. Since the word signal W2 has been applied to the AND circuit 35 in the control circuit 18, the digit signal D2 enables the AND circuit 35 to produce "1", resulting in the flip-flop 38 being set. The flip-flop 38 is reset by the digit signal D6 and thus the output signal of the flip-flop 38, i.e. the gate control signal G3, sustains "1" state for the time period from D2 to D6, as shown in FIG. 5(u). The gate control signal G3 controls the gate circuit 24 so that only the present "hour" and "minute" are applied from output of the clock register 25 to input of the clock register 25, through the gate circuit 24. All the data at the present time read out from the clock register 25 are transferred from the control circuit 18 to the S-P converting circuit 17b where it is converted into parallel data and then is loaded into RAM 21 through the gate circuit 22a. The present time loaded into RAM 21 corresponds to that data to which one second was added in the adder 26. When the word signal W2 and the digit signal D6 are combined, the AND circuit 33 conducts and a "1" is sent from the AND circuit 33 to the flip-flop 37 so that the flip-flop 37 is set. The output of the flip-flop 37 is applied as the gate control signal G1 shown in FIG.

5(V) to the gate circuit 24 and the gate circuit 24 is so controlled that the present "hour" and "minute" are recirculated in the shift registers 25a and 25b. When the word signal W2 and the digit signal D11 are combined, the carry control circuit 31 produces a +1 signal which in turn is added to the timer data.

Figure 8:
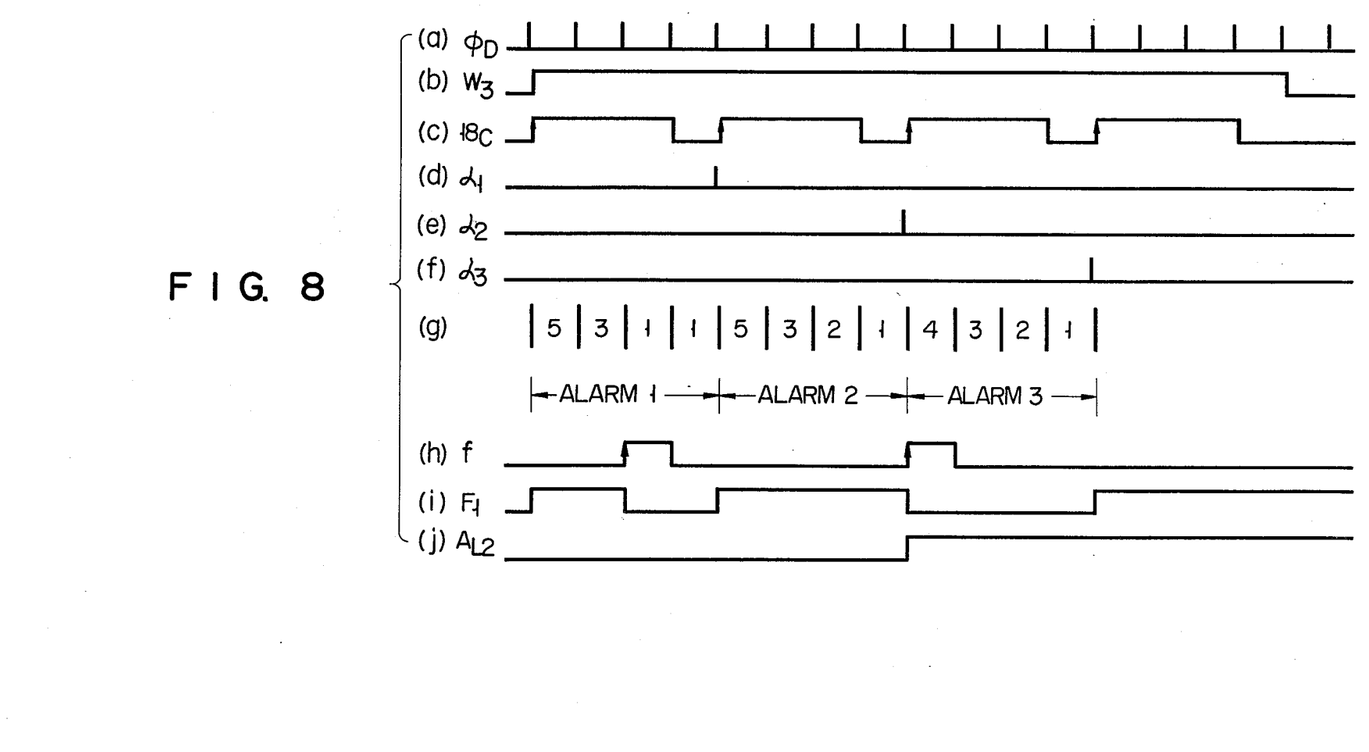

When 64 Hz output signal of the frequency-dividing counter 12 is "1", the word signal W3 produced from the word decoder 15 becomes "1" and the row address becomes "1". Upon this, the alarm data stored in the one row in RAM 21 is read out through the gate circuit 22b and the P-S converter 17a and the read out one is inputted to the coincidence circuit 23 shown in FIG. 1. The output signal of the shift register 25a has been applied to the coincidence circuit 23 and therefore the coincidence circuit 23 compares the time of each alarm with the "hour" and "minute" at the present time in response to the signal delivered from the alarm control circuit 32 through the output lines 18c and 18d. Upon receipt of the word signal W3 from the word decoder 15, the alarm control circuit 32 produces a set signal with four digits intervals as shown in FIG. 8(C) from the output line 18c and sequentially produces pulse signals α1, α2 and α3 as shown in FIGS. 8(d) to (f) in synchronism with the digit signal φD of the fourth digit, through the output line 18d. When the word signal W3 is produced from the word decoder 15, the alarm control circuit 32 produces a set signal through the output line 18, as previously stated, and the flip-flop 44 is set as shown in FIG. 8(i) and the output thereof becomes "1". In response to the word signal W3 shown in FIG. 8(b), alarm data (alarm 1), for example, 11:35, is read out from RAM 21. The read out one is compared with the present time, for example, 12:35, which is held circulating through the shift regiters 25a and 25b in the clock register 25. The comparison is made by the ex-OR circuit 43 in the coincidence circuit 23. In this case, both time data do not coincide with each other so that the output f of the ex-OR circuit 43 becomes "1" as shown in FIG. 8(h) at the application of D2 signal and the flip-flop 44 is reset. When the comparing operation is completed, the alarm control circuit 32 produces the pulse signal α1 as shown in FIG. 8(d) through the output line 18d and the output pulse is then applied to the flip-flop 27a. At this time if the alarm data and the present time do not coincide with each other as just mentioned, the set side output F1 of the flip-flop 44 is "0" and therefore a "0" signal is loaded into the flip-flop 27a. Therefore, no alarm signal is outputted. Then, the alarm control circuit 32 produces again a set signal through the output line 18c and the flip-flop 44 is set. At the same time, the next alarm data (alarm 2), for example 12:35, is read out from RAM 21 and is compared with the present time 12:35 in the ex-OR circuit 43. In this case, since the alarm data is coincident with the present time, the output signal f of the ex-OR circuit 43 is kept "0" state and the flip-flop 44 is not reset. Accordingly, the output F1 of the flip-flop 44 is sustained at a "1" state and the alarm control circuit 32 produces a pulse signal 22 as shown in FIG. 8(e) through the output line 18d, with the result that a "1" signal is loaded into the flip-flop 27b. Accordingly, the alarm signal AL2 outputted from flip-flop 27b becomes "1" as shown in FIG. 8(j) which in turn is sent to the main circuit of the apparatus. Upon the signal "1", the main circuit performs processes such as alarm generation, function control and the like. Succeedingly, the alarm data (alarm 3) is compared with the present time in a similar manner.

In this way, the +1 second time counting operation is performed and the alarm data is processed. A combination of the word signal W3 and the digit signal D10 enables the AND circuit in the control circuit 18 to produce an output signal which in turn resets the flip-flop 38. Therefore, the circulation of the present time through the shift registers 25a and 25b is inhibited. The digit signal D12 and the word signal W3 fully condition the AND circuit 36 of the control circuit 18 to produce an output signal which in turn sets the flip-flop 39. As a result, the gate control signal G2 becomes "1" as shown in FIG. 5 and so that the timer data read out from RAM 21 during the time period ranging from digit signals D12 to D15 is loaded into the shift register 25. When the output signals of 128 Hz and 64 Hz from the frequency dividing counter 12 become both "1", the word decoder 15 produces the word signal W4. The signal W4 resets the flip-flop 39 and the carry control circuit 31 produces a +1 signal at the application thereto of the +1 and "1" is added to the timer data. The +1 added data is successively loaded into RAM 21.

In the example mentioned above, only "hour" and "minute" are kept circulating through the shift registers and are compared with the alarm setting time "hour" and "minute". It is evident that the time data to be compared is not limited to "hour" and "minute" but may be any data mentioned above. In this case, the gate circuit must be controlled on the basis of the time that the time data to be used is read out. The register 25 may be constructed by parallel four bits, with omission of the P-S converter 17a and the S-P converter 17b and, in this case, clock pulses φD and φ2 are used to control the shift register.

As described above, the memory circuit such as RAM and the shift register are used in the clock device according to the invention. Clock data and time setting data are stored in the memory circuit and the stored clock data is read out from the memory circuit into the shift register. The time counting is performed through the shift register. Various controls are carried out by using signals from a given stage of a frequency divider. With such a construction, various controls may be performed without a memory device, such as ROM, having microprograms stored therein, and therefore the circuit of the control circuit may be simplified. With a construction that the clock data is held circulating through the shift register, the comparison of the clock data with a plurality of time setting data may be carried out within a given time period and by a single control instruction, with the results that the data processing time is reduced and the circuit construction is also simplified. This feature is very effective when the clock device with such a feature is incorporated into a separate electronic apparatus. Further, the clock data from the shift register is loaded into the memory circuit for the purpose of the clock data. Accordingly, except the time counting operation, the operation of each decoder may be stopped and hence the control circuit and the shift register may also stop their operation, resulting in power saving.

What we claim is:

1. An electronic timepiece circuit comprising:
   an oscillator (11) for generating a reference signal;
   a frequency dividing circuit means (12) coupled to said oscillator (11) and having a plurality of frequency dividing stages for dividing the frequency of the reference signal to thereby produce signals at given time intervals;

a RAM (21) (random access memory) for storing clock data representing the time, said RAM (21) having address positions each of which stores clock data representing a unit of time, which are designated by address signals and which undergoes read-write control achieved by read-write signals;

a shift register (25) coupled to said RAM (21) for temporarily storing the clock data, said shift register (25) having a memory capacity large enough to store all the clock data stored in said RAM (21) in order to update the clock data;

a gate circuit means (19b, 19c) coupled to said frequency dividing circuit means (12) for supplying an address signal and a read-write signal to said RAM (21) upon receipt of a signal produced by said frequency dividing circuit means (12) at said time intervals; and a control circuit means (18) for updating the clock data by writing all the clock data from said RAM (21) into said shift register (25) at the start of the read period of the read-write signal and for writing the updated clock data into said RAM (21) at the start of the write period of the read-write signal.

2. The electronic timepiece circuit of claim 1, wherein said frequency dividing circuit means (12) is a binary counter comprising $2^n$ flip-flops connected in cascade fashion.

3. The electronic timepiece circuit of claim 1, wherein said frequency dividing circuit means (12) is a binary counter comprising $2^n$ flip-flops connected in cascade fashion so as to produce time intervals each of one second.

4. The electronic timepiece circuit of claim 1 wherein said RAM (21) has memory areas for storing at least the clock data corresponding to "year", "month", "day", "hour", "minute", and "second".

5. The electronic timepiece circuit of claim 1, wherein said shift register (25) has a memory capacity sufficient for simultaneously storing at least the clock data corresponding to "year", "month", "day", "hour", "minute", and "second" with said given time interval.

6. The electronic timepiece circuit of claim 1, wherein said control circuit means (18) includes an adder for updating the clock data written into said shift register (25).

7. An electronic timepiece circuit comprising:

an oscillator (11) for generating a reference signal;

a frequency dividing circuit means (12) coupled to said oscillator (11) and having a plurality of frequency dividing stages for dividing the frequency of the reference signal to thereby produce signals at given time intervals;

a RAM (21) (random access memory) for storing clock data representing the time and time setting data representing an alarm time, said RAM (21) having address positions each of which is designated by an address signal and which undergoes read-write control achieved by read-write signals;

a shift register (25) coupled to said RAM (21) for temporarily storing the clock data, said shift register (25) having a memory capacity large enough to store all the clock data stored in said RAM (21) in order to update the clock data;

a gate circuit means (19b, 19c) coupled to said frequency dividing circuit means (12) for supplying an address signal and a read-write signal to said RAM (21) upon receipt of a signal produced by said frequency dividing circuit means (12) at said time intervals;

a control circuit means (18) for updating the clock data by writing all the clock data from said RAM (21) into said shift register (25) at the start of the read period of the read-write signal and for writing the updated clock data into said RAM (21) at the start of the write period of the read-write signal; and a coincidence circuit means (23) for reading said time setting data from said RAM (21) to thereby detect whether the time setting data coincides with the clock data held by said shift register (25).

8. The electronic timepiece circuit of claim 7, wherein said RAM (21) has a memory area for storing the clock data and a plurality of time setting data.

9. The electronic timepiece circuit of claim 7, wherein said shift register (25) circulatingly holds at least "hour" and "minute" of the clock data.

10. The electronic timepiece circuit of claim 7, wherein said coincidence circuit means (23) compares the clock data and time setting data in a time division manner within one word time interval.

* * * * *